United States Patent [19]
Yamamoto et al.

[11] Patent Number: 5,691,513
[45] Date of Patent: Nov. 25, 1997

[54] SCANNING METHOD FOR SENSOR COILS IN COORDINATE DATA INPUT DEVICE

[75] Inventors: Masayasu Yamamoto; Takeshi Yoneda, both of Otone-machi, Japan

[73] Assignee: Wacom Co., Ltd., Otone-machi, Japan

[21] Appl. No.: 533,458

[22] Filed: Sep. 25, 1995

[51] Int. Cl.$^6$ .................... G08C 21/00; G09G 3/02
[52] U.S. Cl. .................... 178/19; 178/18; 345/173; 345/175; 345/179
[58] Field of Search .................... 178/18, 19; 345/173, 345/174, 175, 179

[56] References Cited

U.S. PATENT DOCUMENTS

| | | | |
|---|---|---|---|
| 4,020,281 | 4/1977 | Davis, Jr. | 178/18 |
| 4,878,553 | 11/1989 | Yamanami et al. | 178/18 |
| 4,948,926 | 8/1990 | Murakami et al. | 178/19 |
| 5,028,745 | 7/1991 | Yamanami et al. | 178/19 |
| 5,196,836 | 3/1993 | Williams | 345/175 |
| 5,414,226 | 5/1995 | Matsushima | 178/18 |
| 5,552,568 | 9/1996 | Onodaka et al. | 345/179 |

FOREIGN PATENT DOCUMENTS

| | | |
|---|---|---|
| 2-53805 | 6/1990 | Japan. |
| 5-241722 | 9/1993 | Japan. |
| 6-75683 | 3/1994 | Japan. |

*Primary Examiner*—Curtis Kuntz
*Assistant Examiner*—Vijay Shankar
*Attorney, Agent, or Firm*—Shlesinger Arkwright & Garvey

[57] ABSTRACT

A primary object is to provide a scanning method resulting in high speed and correct operation in a coordinate data detecting process. The scanning method for succeedingly selecting sensor coils arranged on a sensor plate in a coordinate data input device comprises an interval scanning operation in which a limited number of the whole sensor coils are selected at a predetermined interval space to detect coordinate data of a pointing device. In one preferable mode, the above described interval scanning operation is repeated until a signal representing the existence of the pointing device is detected, and this interval scanning operation is performed on the respective sensor coil arrays. Each interval space includes one to three sensor coils.

17 Claims, 6 Drawing Sheets

Electromagnetic Signal Transmitting and Receiving Type

Fig. 7

Pointing Device Transmitting Type

Fig. 8

Cross Type

Fig. 9

Cross Type

Fig. 10

Self-Oscillating Type

Fig. 11

Self-Oscillating Type

SCANNING METHOD FOR SENSOR COILS IN COORDINATE DATA INPUT DEVICE

BACKGROUND OF THE INVENTION

1. Field of the Invention

The present invention relates generally to a method for detecting pointed position in a coordinate data input device such as a digitizer or tablet. Particulary, the present invention relates to a scanning method for sensor coils arranged on a sensor plate of such coordinate data input devices.

2. Description of the Prior Art

Figure 1:
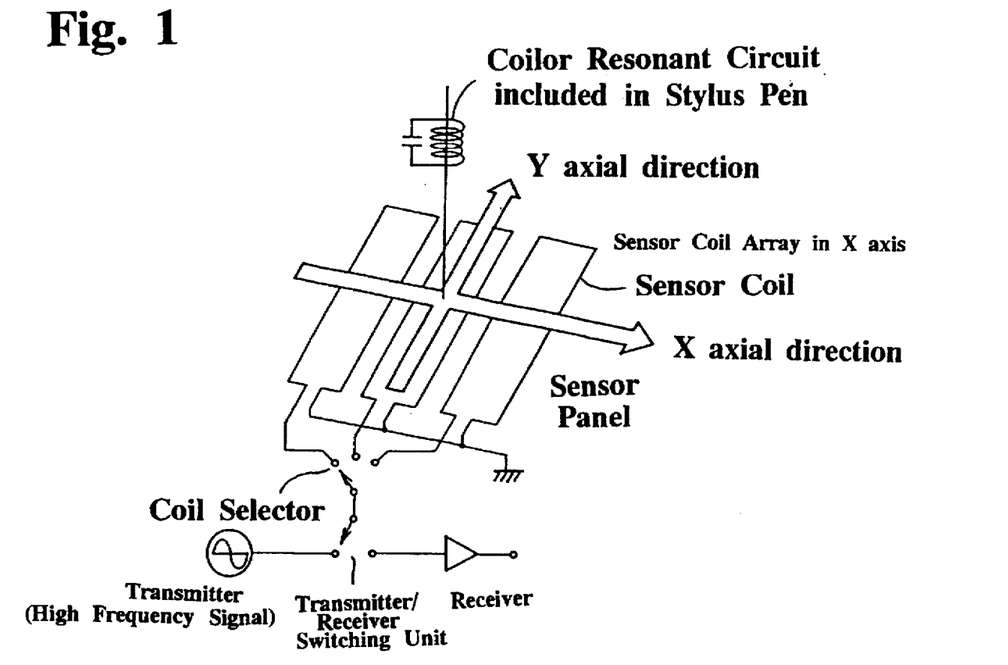
FIG. 1 is a schematic illustration showing a structure of conventionally used electromagnetic signal transmitting and receiving type coordinate data input device for explaining basic operation thereof.

Conventionally, various methods for detecting pointed position in coordinate data input deivces are known. For example, a typically known electromagnetic communicating system through a transmitter/receiver switching means will be described. Such type provides merit in removing the connection cable between a pointing device and the coordinate data input device. FIG. 1 is a schematic illustration explaining basic operations of such an electromagnetic type. Such conventional coordinate data input device comprises a sensor panel (pointed place detecting surface) including a plurality of sensor coils which are arranged in parallel and oriented in the same direction, and a pointing device such as a stylus pen or cursor including a coil or resonant circuit. Ordinarily, these devices are provided with a pair of sensor panels which are arranged in the X axial direction and the Y axial direction to detect coordinate data in two directions; the X and Y axial directions. In these devices, coordinate data detecting operation is performed by using electromagnetic interaction generated between the sensor coils of the sensor panels and a tuning circuit or a resonant circuit included in the pointing device.

Referring to FIG. 1, a typical detecting operation performed at each sensor coil in coordinate data detecting process will be described. First, a selected sensor coil is supplied with a high frequency signal from a transmitter so that the selected sensor coil generates an electromagnetic wave. If a pointing device is located above the selected sensor coil, the resonant circuit of this pointing device is resonated with the electromagnetic wave from the sensor coil. As the electromagnetic wave from the sensor coil is stopped, the resonant circuit of the pointing device generates a response electromagnetic wave. Then, the selected sensor coil receives the response electromagnetic wave. This received signal is supplied to a signal processor through a receiver so that amplitude and phase of the received signal are analyzed.

The same operation will be repeatedly and successively performed on each of the plural sensor coils in response to selecting operation of a coil selector and switching operation of a transmitter/receiver switching unit. This selecting operation on such plural sensor coils is known as scanning. Conventional coordinate data input devices are provided with coil selector composed of multiplexer and so on to scan plural sensor coils. The coil selector and the transmitter/receiver switching unit are controlled by a signal control unit, not shown, associated with the coordinate data input device.

Conventional coordinate data detecting process from the first state that the coordinate data on the pointing device is not detected at all to the final state that the coordinate data on the pointing device has been correctly detected is started from "rough detecting process" for scanning all sensor coils arranged on the sensor panel. This rough detecting process provides a distribution curve of received signals over the sensor panel in response to the received signals from these sensor coils. When the pointing device is located below the guaranteed height for detection of the sensor panel, the distribution curve of received signals from this pointing device shows a peak of signal power level which is generated by the sensor coil most closely located to the pointing device. This allows detection of an approximate position of the pointing device.

Following this rough detecting process, "precise detecting process" is started. In the precise detecting process, the above described transmitting and receiving operation is repeated using only a few sensor coils which are related to the peak signal and its neighborhood. When the peak level appears again in the received signal distribution, this precise detecting process can confirm the existence of the pointing device. Further arithmetic operations containing interpolation are performed in accordance with the various signal data resulting from this precise detecting process to determine the accurate coordinate position of the pointing device. In order to obtain further precise data, scanning may be repeated several times in the precise detecting process. A typical example of this coordinate data detecting system is shown in Japanese Patent Publication No.2-53805/1990.

Various types of coordinate data detecting methods are known and practically used. For example, a simple electromagnetic induction system utilizes electromagnetic wave transmitted from a sensor plate and received by a pointing device, or the reverse. A cross type detecting method includes transmission of electromagnetic wave from one sensor coil arranged in the X axial direction and reception of the electromagnetic wave by another sensor coil arranged in the Y axial direction. In addition to these methods, an self-oscillating type detecting method is shown in Japanese Patent Application Open to Public Inspection No.5-241722/1993. In such a self-oscillaitng type detecting method, sensor coils in the X axial direction and the Y axial direction are not coupled with each other through electromagnetic means. Both sensor coils are electromagnetically coupled with resonant circuit included in a pointing device to form a positive feedback loop for an amplifier connected to both sensor coils. Accordingly, this arrangement allows the amplifier to generate self-oscillation when the pointing device and both sensor coils are electromagnetically coupled. The thus generated self-oscillating signal is utilized to detect the position of the pointing device.

As disclosed above, conventional detecting processes are based on various methods and the detail of each process may be also varied in response to its embodiment. However, the above described rough detecting process is required for every detecting method. In other words, any type of coordinate data detecting method requires completing the stage from when coordinate data on a pointing device is not detected at all to the stage when the approximate position of the pointing device with respect to a sensor panel is known. In commonly used rough detecting processes, all sensor coils are successively subjected to scanning. In general, this scanning operation is performed from one end to the other end of each sensor coil.

Such scanning operation requires a relatively long period because many sensor coils are scanned one by one. This means that a longer period is required the larger the device. A longer period for performing the rough detecting process may spoil a high speed coordinate data detecting operation.

Figure 2:
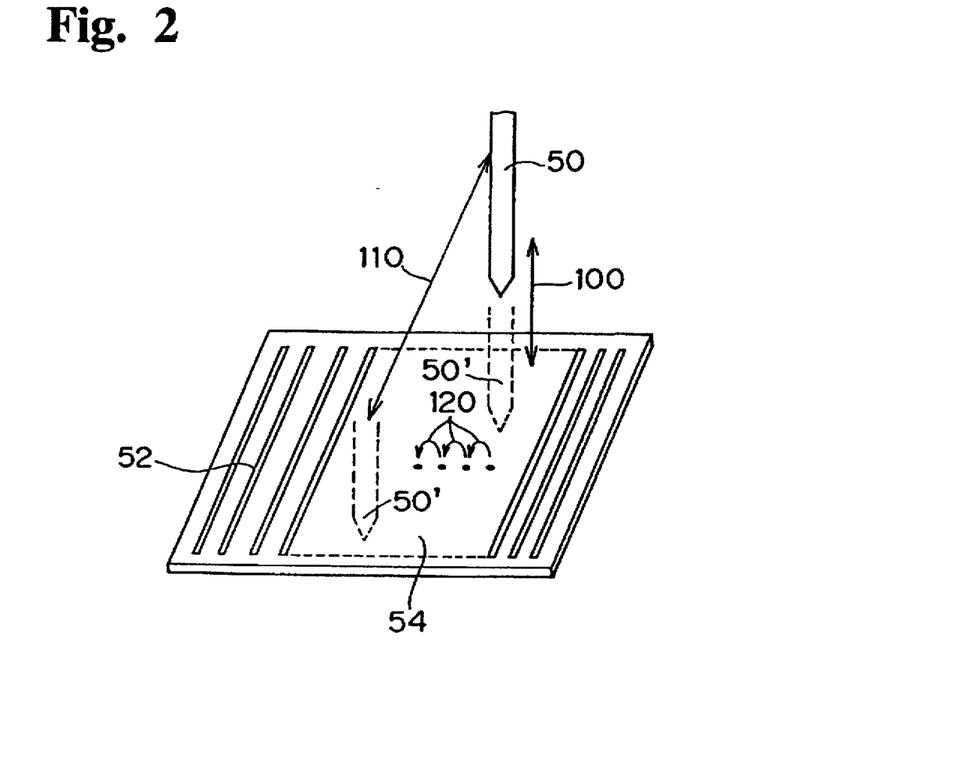
FIG. 2 is a schematic illustration showing a sensor panel and a pointing device used in conventionally used coordinate data input device for explaining problems caused in conventional scanning method.

Referring to FIG. 2, an example of coordinate data input device which may cause the above described problems is shown. In the drawing, the coordinate data input device includes a pointing device such as a cordless type stylus pen 50 and a sensor panel 54 having many sensor coils 52. To avoid confusion, this drawing shows only the sensor coils arranged in one axial direction. The sensor plate corresponds to the effective input area on a tablet surface. Since the detecting operation is performed by the electromagnetic interaction between the sensor coil 52 and the pointing device 50, there is a limit in height in detecting the pointing device 50. The perfectly detectable height defined between the surface of the sensor panel 54 and the pointing device will be referred to as "guaranteed detectable height". Practically, this guaranteed detectable height is about a few centimeters. It is assumed that the pointing device 50 is quickly moved up and down between the position at a height of several tens centimeters and the surface of the sensor panel 54 as shown by the arrow 100 or 110 in FIG. 2. In detail, the pointing device 50 is moved from the higher position than the guaranteed detectable height and entered into the region of the guaranteed detectable height, and the pen point of the pointing device 50 is brought into contact with the surface of the sensor panel 54 as shown in the broken line 50'. Then, the pointing device 50 is moved again out of the region of the guaranteed detectable height. This operation is performed to point out the desired position on the sensor plate 54. During this operation, if the pointing device 50 is passed through the region of the guaranteed detectable height within a shorter period than scanning period required for single-scanning over the sensor panel 54, the pointing device 50 may not be detected. This means that the pointed position can not be detected. Even if the pointing device 50 is detected during the rough detecting process, the succeeding precise detecting process may be not completed within the period while the pointing device 50 is passing through the region of the guaranteed detectable height.

To further illustrate that several points 120 are closely and succeedingly pointed, it is possible that the pointing device 50 can not be detected even when the pointing device 50 remains within the region of the guaranteed detectable height. This operation is performed to draw graphical dots, as an example. Since these dots are too close, the shifting period of the pointing device to an adjacent dot may be shorter than the scanning period over the sensor plate 54. As a result, each position of these graphical dots can not be exactly detected.

The above described problems may be often caused in larger digitizers with sensor plates as large as Sheet No. A2 or A0 defined by Japanese Industrial Standard. Scanning operation from one end to the other end of such larger sensor plates may need at least one third or one fourth of a second. This scanning period is equivalent to the period required for a user's high speed motion.

BRIEF SUMMARY OF THE INVENTION

It is therefore an object of the present invention to provide an improved scanning method resulting in high speed and correct operation in a coordinate data detecting process.

Another object of the present invention is to provide an improved scanning method which can perform scanning operation over the whole surface of a sensor plate of a coordinate data input device within a predetermined short period.

A further object of the present invention is to provide an improved scanning method for reducing the period required for detecting a pointing device to improve the ability of the coordinate data input device.

In the first aspect of the present invention, a coordinate data input system which includes a sensor plate containing a plurality of sensor coils arranged parallel to the detecting direction and a pointing device, and detects the coordinate data on the pointing device by an interaction between each one of the sensor coils and the pointing device, a scanning method for succeedingly selecting one from the sensor coils to detect the signal generated by the interaction comprises:

an interval scanning operation for scanning, skipping the predetermined number of sensor coils, the limited sensor coils located at the predetermined interval space of the whole sensor coils.

Here, the scanning method, the interval scanning operation may be repeated until the signal representing the existence of the pointing device may be detected, and the interval scanning step is performed on respective arrays of the sensor coils.

Here, the scanning method, the predetermined number of sensor coils to be skipped may be one to three.

Here, the scanning method, the interval scanning operation may be applied to a first type of coordinate data input device which allows the selected sensor coil to transmit an electromagnetic signal to the pointing device and to receive the response electromagnetic signal generated by an electromagnetic interaction between the transmitted electromagnetic signal and a coil or resonant circuit included in the pointing device so that the received signal is detected as the coordinate data of the pointing device relating to the sensor plate; and the interval scanning operation may be performed to select the sensor coil.

Here, the scanning method, the interval scanning operation may be applied to a second type coordinate data input device which allows a first group of sensor coils to transmit an electromagnetic signal to the pointing device and a second group of sensor coils to receive the response electromagnetic signal generated by electromagnetic interaction between the transmitted electromagnetic signal and a coil or resonant circuit included in the pointing device so that the received signal is detected as the coordinate data of the pointing device relating to the sensor plate; and the above described interval scanning operation may be performed on both the first and second groups of sensor coils.

Here, the scanning method, the first group of sensor coils and the second group of sensor coils may be perpendicularly located to each other.

Here, the scanning method, the above described first group of sensor coils and the second group of sensor coils may be arranged in parallel.

Here, the scanning method, the interval scanning operation may be applied to a third type of coordinate data input device which allows the selected first group of sensor coils to transmit an electromagnetic signal to the pointing device and the selected second group of sensor coils to receive the response electromagnetic signal generated by an electromagnetic interaction between the transmitted electromagnetic signal and a coil or resonant circuit included in the pointing device so that the received signal is detected as the coordinate data of the pointing device relating to the sensor plate; and the interval scanning operation may be performed on only the first group of sensor coils.

Here, the scanning method, the first group of sensor coils and the second group of sensor coils may be perpendicularly located to each other.

Here, the scanning method, the first group of sensor coils and the second group of sensor coils may be arranged in parallel.

Here, the scanning method, the interval scanning operation may be applied to a fourth type of coordinate data input device which allows the selected first group of sensor coils to transmit an electromagnetic signal to the pointing device and the selected second group of sensor coils to receive the response electromagnetic signal generated by electromagnetic interaction between the transmitted electromagnetic signal and a coil or resonant circuit included in the pointing device so that the received signal is detected as the coordinate data of the pointing device relating to the sensor plate; and the above interval scanning operation may be performed on only the second group of sensor coils.

Here, the scanning method, the first group of sensor coils and the second group of sensor coils may be perpendicularly located to each other.

Here, the scanning method, the first group of sensor coils and the second group of sensor coils may be arranged in parallel.

Here, the scanning method, the interval scanning operation may be applied to a fifth type of coordinate data input device which allows the above described pointing device to transmit an electromagnetic signal and the selected sensor coil to receive the electromagnetic signal generated by an electromagnetic mutual function between the transmitted electromagnetic signal so that the received signal is detected as the coordinate data of the pointing device relating to the sensor plate; and the above interval scanning operation may be performed to select the sensor coils.

Here, the scanning method, the interval scanning operation may be applied to a sixth type of coordinate data input device which includes an amplifier, two groups of sensor coils being perpendicularly located to each other without electromagnetic coupling, and a resonant circuit included in the pointing device so that a positive feedback loop is formed by the amplifier, the two sensor coils selected from the two groups and respectively connected to the input terminal and output terminal of the amplifier to generate an self-oscillated signal which is detected as the coordinate data of the pointing device relating to the sensor plate; and the above interval scanning operation may be performed on both groups to select the sensor coils to be connected to the input terminal and output terminals of the amplifier.

Here, the scanning method, the interval scanning operation may be applied to a sixth type of coordinate data input device which includes an amplifier, two groups of sensor coils being perpendicularly located to each other without electromagnetic coupling, and a resonant circuit included in the pointing device so that a positive feedback loop is formed by the amplifier, the two sensor coils selected from the two groups and respectively connected to the input terminal and output terminal of the amplifier to generate an self-oscillated signal which is detected as the coordinate data of the pointing device relating to the sensor plate; and the above interval scanning operation may be performed on only one group to select the sensor coil to be connected to the input terminal of the amplifier.

Here, the scanning method, the interval scanning operation may be applied to a sixth type of coordinate data input device which includes an amplifier, two groups of sensor coils being perpendicularly located to each other without electromagnetic coupling, and a resonant circuit included in the pointing device so that a positive feedback loop is formed by the amplifier, the two sensor coils selected from the above described two groups and respectively connected to the input terminal and output terminal of the amplifier to generate an self-oscillated signal which is detected as the coordinate data of the pointing device relating to the sensor plate; and the above interval scanning operation may be performed on only one group to select the sensor coil to be connected to the output terminal of the amplifier.

Since the sensor coil scanning method defined as above performs interval scanning, the period for scanning from one end to the other end of all the sensor coils can be reduced. Such interval scanning is advantageously used for a rough detecting process to detect rough position of the pointing device during coordinate data detecting process. When such interval scanning on one array of sensor coils could not detect the positioning device, the same interval scanning is repeatedly performed on the other array of sensor coils. The repetition of such interval scanning may sometimes result in scanning over all sensor coils. However, in a practical scene, the probability of the position of the pointing device being detected before all sensor coils have been scanned is relatively high. Whenever the position of the pointing device has been detected, further scanning is not performed and then the succeeding precise detecting step will be started. This operation allows the period for scanning sensor coils to be reduced. As a result, in a statistical observation, the method according to the present invention may reduce the total period for detecting coordinate data of the pointing device.

Since the scanning method according to the present invention provides interval scanning over all sensor coils arranged at regular interval, the equivalent guaranteed detectable height is ensured over the whole surface of the sensor plate. This means that the probability of the pointing device being detected is almost constant regardless of the position of the pointing device.

These and other objects, features and advantages of the invention will become more apparent upon a reading of the following detailed specification and drawings.

BRIEF DESCRIPTION OF THE DRAWING

A preferred form of the present ivention is illustrated in the accompanying drawing in which.

DETAILED DESCRIPTION OF THE PREFERRED EMBODIMENT

Figure 3:
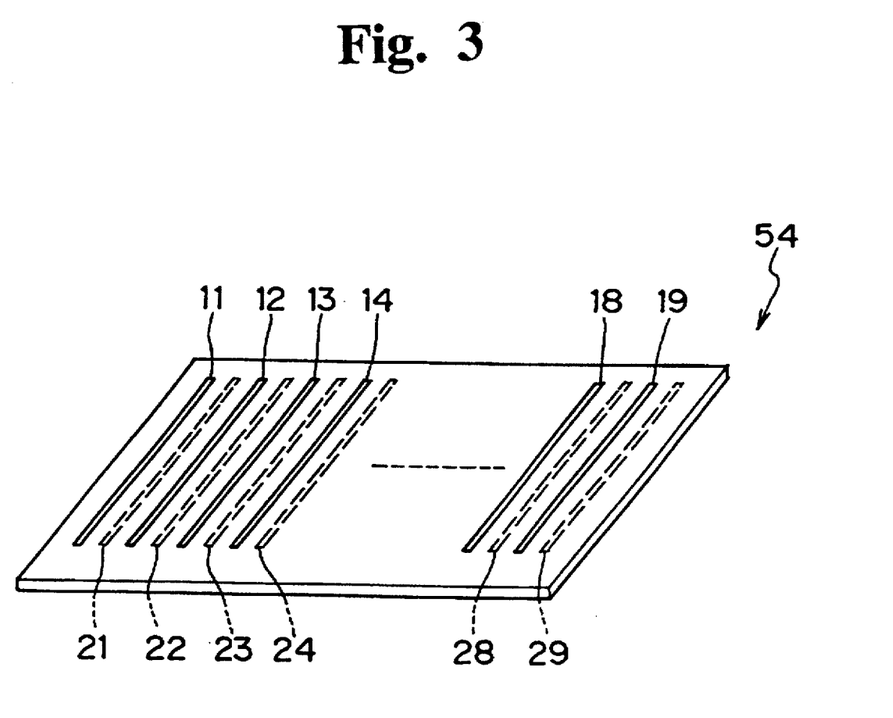
FIG. 3 is a schematic illustration showing a sensor plate for explaining the scanning method for scanning sensor coils arranged on the sensor plate as an embodiment according to the present invention.

The present invention will be understood by discussing some preferred embodiments in conjuction with the accompanying drawings. Referring to FIG. 3, a sensor plate 54 associated to a coordinate data input device for explaining one embodiment of the scanning method according to the present invention is shown. To avoid confusion, this sensor plate 54 shows only some sensor coils arranged in one axial direction. One sensor coil is represented by either a solid line or a broken line. Although the sensor coils are not overlapping, this embodiment may include an overlapping type sensor coil arrangement.

In the scanning method according to the present invention, a rough detecting step is first performed. FIG. 3 shows one embodiment of this rough detecting step wherein scanning is performed at intervals from one end to the other end on the sensor plate 54. In the drawing, the sensor coils 11, 12, . . . , 19 represented by a solid line are subjected to this interval scanning operation. Since the sensor coils are arranged at equal spaces in turns, each space of the interval-scanned sensor coils is also equivalent. This interval scanning is referred to as "first scanning". The period required for only this first scanning decreases by approximately one-half of the full-scanning operation performed in the conventional method. Whenever the first scanning provides a peak signal representing the existence of a pointing device, a precise detecting process is succeedingly started at once. This precise detecting process centers the sensor coil providing the peak signal.

If the first scanning does not provide the peak signal at all, then omitted sensor coils; 21, 22, . . . , 29 represented by a broken line, will be scanned in turn. This scanning operation is referred to as "second scanning". Whenever the second scanning provides a peak signal representing the existence of a pointing device, a precise detecting process is succeedingly started at once. This precise detecting process centers the sensor coil providing the peak signal. When the second scanning was performed, the period required for the first and second scanning may correspond to that of a full-scanning operation.

As shown in FIG. 3, all of the sensor coils are subjected to a two stage type detecting process including the frist and second scanning operations which perform a scanning operation omitting every other sensor coil. If the pointing device is detected by the first scanning step, the second scanning step will be omitted. The probability of the second scanning step being omitted is fifty percent. Accordingly, when an operator continuously repeats such rough detecting operation as shown in FIG. 3 through the coordinate data input device, the repetition of the first scanning operation will result in a decrease of the total period of time required for the coordinate data detecting operation. From a statistical view point, the scanning period over the sensor coils during the rough detecting process may be about 75% shorter than the conventional case.

Figure 4:
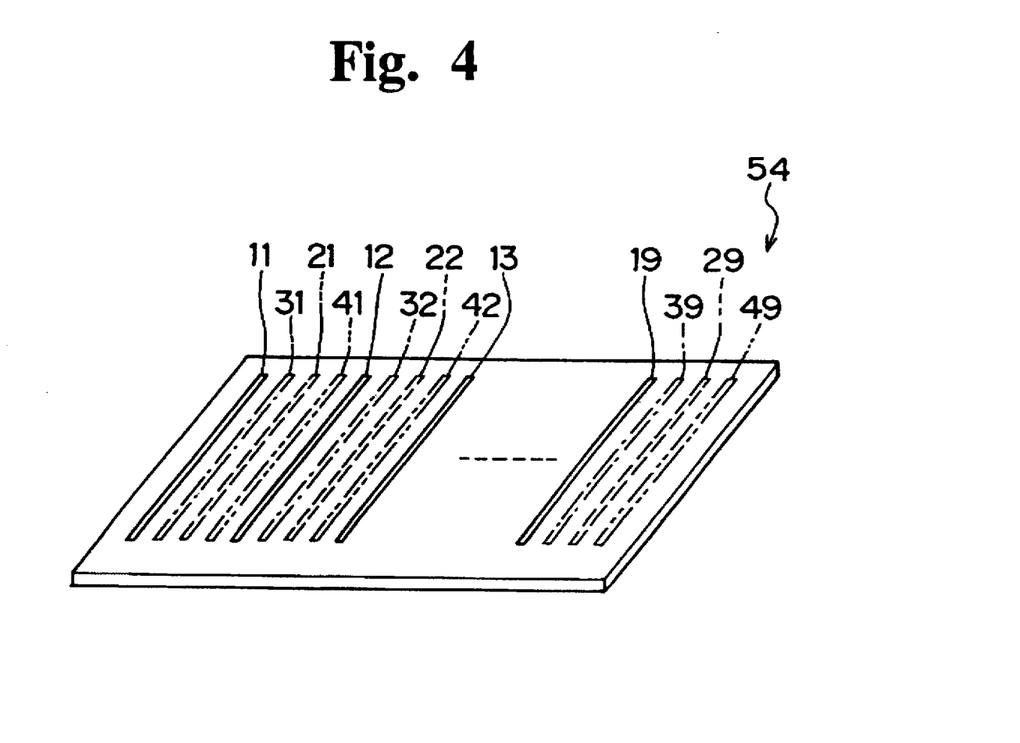
FIG. 4 is a schematic illustration, for expaining another embodiment according to the present invention.

FIG. 4 shows a sensor plate like FIG. 3, explaining another embodiment of the scanning method for scanning sensor coils arranged on the sensor plate. In rough detecting step, scanning is performed at intervals skipping three sensor coils from one end to the other end on the sensor plate 54. In the drawing, the sensor coils 11, 12, . . . , 19 represented by a solid line are subjected to this interval scanning operation. This interval scanning is referred to as "first scanning" as well as in FIG. 3. The period required for only this first scanning decreases by approximately one-fourth of the full-scanning operation. Whenever the first scanning provides a peak signal representing the existence of a pointing device, a precise detecting process is succeedingly started at once. This precise detecting process centers the sensor coil providing the peak signal.

If the first scanning does not provide the peak signal at all, then the center sensor coil of the omitted three coils within each interval; that is, 21, 22, . . . , 29 representedy broken line, will be scanned from one end to the other end, as shown in FIG. 4. This scanning operation is referred to as "second scanning" as well as in FIG. 3. Whenever the second scanning provides a peak signal representing the existence of a pointing device, the precise detecting process is succeedingly started at once in the same manner as above. The period required for the first and second scanning steps may result in half of the full-scanning operation.

If the second scanning does not provide the peak signal at all, then scanning is performed at intervals skipping three sensor coils from the second coil closest to the left side of the other end on the senser plate 54 as shown in FIG. 4. That is, the sensor coils 31, 32, . . . , 39 represented by one dotted phantom line are subjected to this interval scanning operation. This scanning operation is referred to as "third scanning". Whenever the third scanning provides a peak signal representing the existence of a pointing device, the precise detecting process is succeedingly started at once in the same manner as above. The total period required for the first, second and third scanning steps may result in three-quarters of the full-scanning operation.

If the third scanning does not provide the peak signal at all, then scanning is performed on the remaining coils at intervals skipping three coils. That is, the sensor coils 41, 42, . . . , 49 represented by two dotted phantom lines are subjected to this interval scanning operation. This scanning operation is referred to as "fourth scanning". When the pointing device is located within the guaranteed detectable height, the fourth scanning certainly detects the pointing device. The total period required for the first to fourth scanning steps may result in the equivalent period required for full-scanning operation.

When an operator continuously repeats such rough detecting operation as shown in FIG. 4 through the coordinate data input device, the repetition of the first to the fourth scanning operations will result in a decrease of the total period of time required for the coordinate data detecting operation. From a statistical view point, the scanning period over the sensor coils during the rough detecting process in the embodiment shown in FIG. 4 may be about 62.5% shorter than the conventional case.

The scanning methods shown in FIG. 3 and FIG. 4 are advantageously used for obtaining information on a pointing device from the whole surface of the sensor plate within a relatively short period. Even when all sensor coils have been scanned, an operator may encounter a few cases where a pointing device can not be detected because the pointing device is located out of the guaranteed detectable height. The operator is requested to repeat the above described scanning sequence from the first scanning step.

Figure 5A:
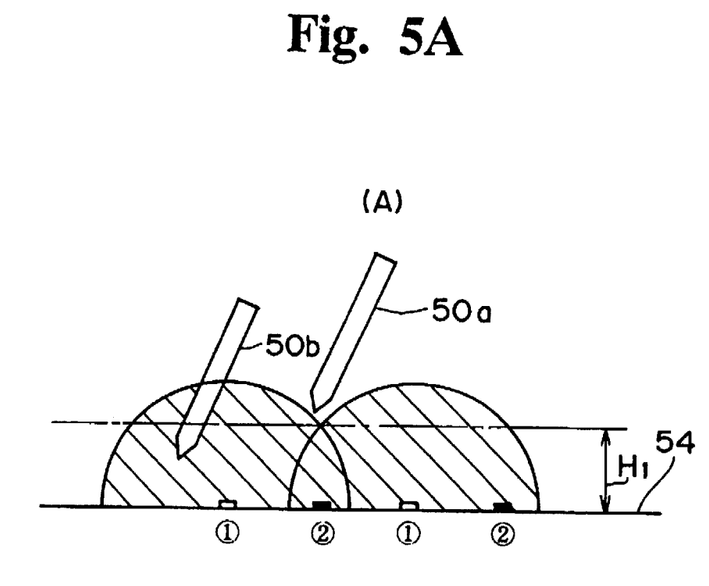
FIG. 5 is a partial cross sectional view taken along the longitudinal direction of the sensor plate shown in FIG. 3 for explaining a typical operation of the scanning method according to the present invention.
Figure 5B:
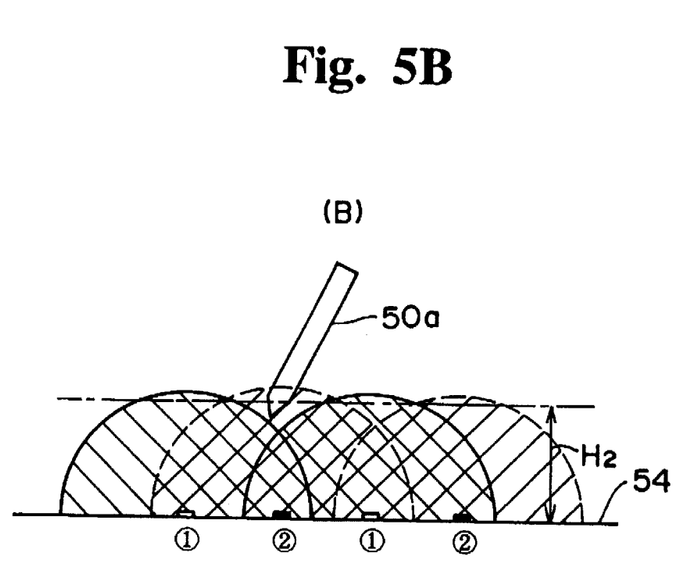

Referring to FIG. 5A & 5B, a typical operation of the scanning method as shown in FIG. 3 will be described. FIG. 5A & 5B show a partial cross section taken along the longitudinal axis of the sensor plate shown in FIG. 3. For convenience sake, the cross section of each sensor coil is exaggerately shown. White sensor coils represented by ① are subjected to the first scanning and black sensor coils ② are subjected to the second scanning. FIG. 5(A) shows the state of the first scanning operation. A shadowed half circle area represents the detectable area by the sensor coil ①. A pointing device 50a can not be detected by this first scanning operation because the device 50a is located out of the detectable area. On the other hand, a pointing device 50b located in the detectable area can be detected by this first scanning operation. Thus the guaranteed detectable height by this first scanning at an interval skipping one sensor coil is defined by H1 as shown in FIG. 5(A). Whenever the first scanning could not detect the pointing device 50a, the second scanning begins as shown in FIG. 5(B). Since the detectable area of the sensor coils ② is represented by the shadowed half circle area surrounded by a broken line, the pointing device 50a can be detected by this second scanning. As a result, the guaranteed detectable height by the first and second interval scanning is represented by H2 as shown in FIG. 5(B).

The guaranteed detectable height H1 by the first scanning step is lower than the guaranteed detectable height H2 by the first and second scanning steps. This means that the detectable area with respect to height by only the first scanning step is narrower. However, when the height H1 is sufficiently high to detect the pointing device, the rough detecting process will be completed by only the first scanning step. This case will reduce the period for the rough detecting process to half of the conventional case.

In the first scanning method skipping one sensor coil as shown in FIG. 3, the sensor coils to be subjected to the second scanning are automatically determined. On the other hand, in the first scanning method skipping three sensor coils as shown in FIG. 4, the second scanning may select any one group from three groups of the sensor coils. It is preferable to select the center group for the second scanning as this will keep the guaranteed detectable height at almost the same level over the whole surface of the sensor plate.

In such interval scanning methods skipping three or more sensor coils, it is desirable to select the center coil of the skipped sensor coils for the succeeding scanning step. However, in specific cases where skipped sensor coils number four or more, an operator may select either of the two sensor coils close to the center for the second scanning.

In the interval scanning method according to the present invention, the number of skipped sensor coils is not limited, but the most effective number will be naturally determined in response to the size of the coordinate data input device and the detectable area of each sensor coil of the coordinate data input device. Generally, in the case where the coordinate data input device is relatively large and has many sensor coils, it is particularly effective to take as large a number as possible of the sensor coils to be skipped within the detectable area of each sensor coil. Since in any case the scanning operation will be performed at a constant interval, the guaranteed detectable height will be kept at an equivalent level over the whole surface of the sensor plate.

Figure 6:
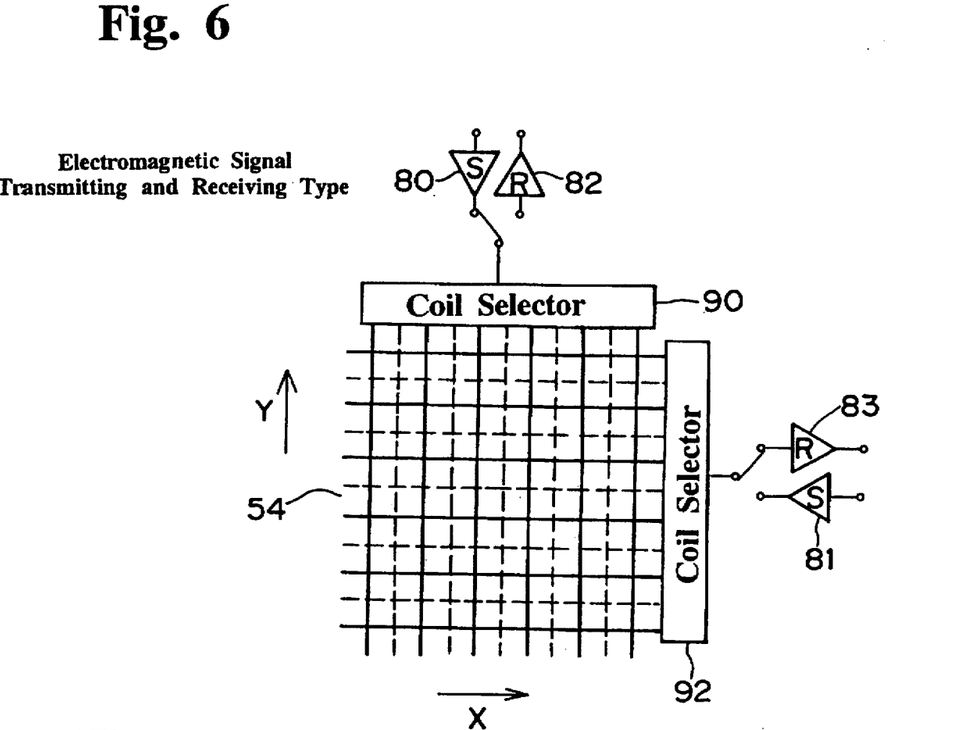
FIG. 6 is a schematic illustration showing a structure of an electromagnetic signal transmitting and receiving type coordinate data input device through which one embodiment of the present invention is performed.

FIG. 6 is a schematic illustration showing a structure of an electromagnetic signal transmitting and receiving type of coordinate data input device for explaining one embodiment of the present invention. In this drawing, the sensor coils for the first and second scanning steps are respectively represented by a solid line and a broken line for convenience sake. The shown coordinate data input device includes coil selectors 90 and 92 which are switching means to select one of the sensor coils arranged in parallel in the X axial direction and the Y axial direction, respectively. The coil selector 90 is electrically connected to either transmitter 80 or receiver 82. Also, the coil selector 92 is electrically connected to either transmitter 81 or receiver 83. In ordinarily used electromagnetic signal transmitting and receiving types of coordinate data input devices, a transmitter transmits an electromagnetic signal having high frequency to a selected sensor coil and then the selected sensor coil receives a returned electromagnetic signal from a pointing device. As shown in FIG. 6, in a rough detecting process to detect the rough position of the pointing device, the first scanning operation is performed to succeedingly select one of the sensor coils, solid line, in the X and Y axial directions, skipping one. In detail, an electromagnetic signal is succeedingly transmitted to the sensor coils skipping one and a response signal from the pointing device is received through the selected coil. Whenever this first scanning operation can not detect, the second scanning operation will start to succeedingly select one of the remaining sensor coils represented by broken line.

It is possible to apply the present invention to other electromagnetic signal transmitting and receiving types, for example, the receiving coil is different from the transmitting coil.

Figure 7:
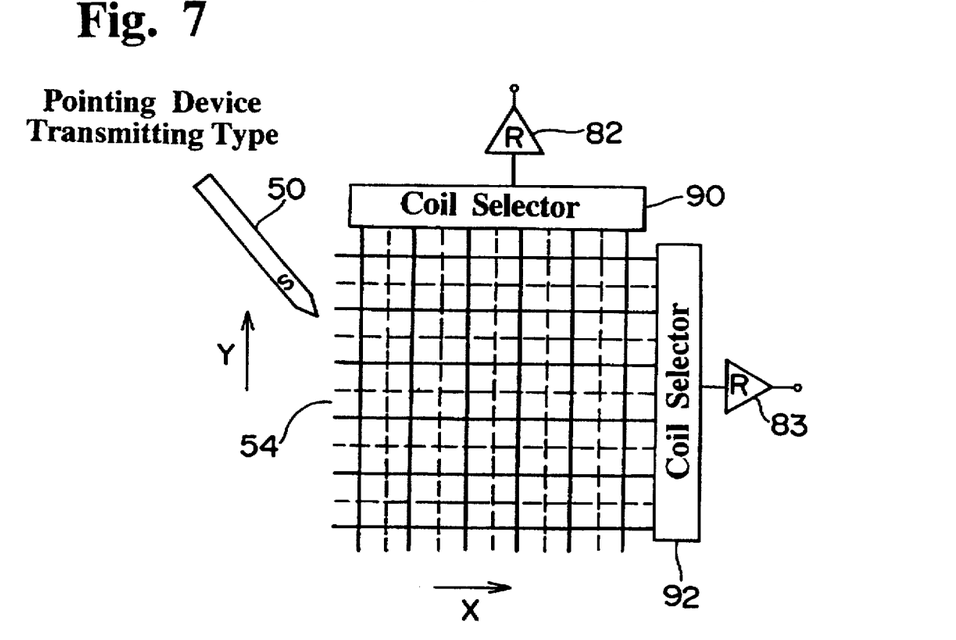
FIG. 7 is a schematic illustration showing a structure of a pointing device transmitting type coordinate data input device through which one embodiment of the present invention is performed.

FIG. 7 is a schematic illustration showing a structure of a pointing device transmitting type of coordinate data input device for explaining one embodiment of the present invention. This type of coordinate data input device may employ a cordless type pointing device 50 including a battery and an electromagnetic signal generating circuit or another type supplied with an electromagnetic signal from the an external unit through a connection code. The coordinate data input device shown in FIG. 5 detects the pointing device when the selected sensor coil receives the electromagnetic signal transmitted from the pointing device 50. This coordinate data input device includes coil selectors 90 and 92 which are switching means to select one of the sensor coils arranged in parallel in the X axial direction and the Y axial direction, and receivers 82 and 83 electrically connected to the coil selectors 90 and 92, respectively. These coil selectors 90 and 92 are actuated to scan the sensor coils to receive the electromagnetic signal from the pointing device 50.

In a rough detecting process to detect the rough position of the pointing device 50, the first scanning operation is performed to succeedingly select one of the sensor coils, solid line, in the X and Y axial directions skipping one. In detail, an electromagnetic signal transmitted from the pointing device 50 is received by the sensor coils scanned skipping one. Whenever this first scanning operation can not detect, the second scanning operation will start to succeedingly select one of the remaining sensor coils represented by the broken line.

Figure 8:
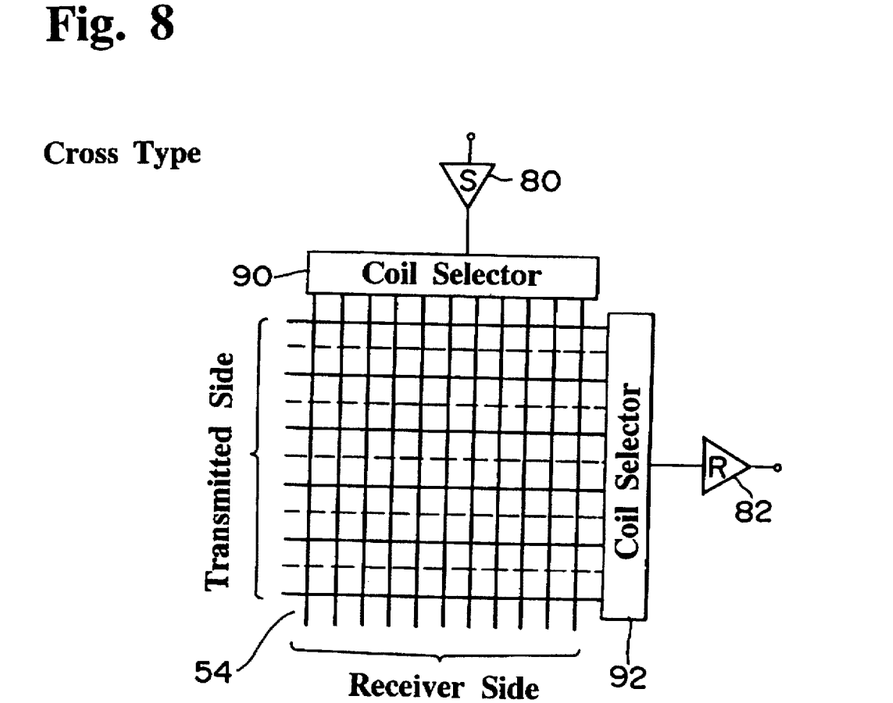
FIG. 8 is a schematic illustration showing a structure of a cross type coordinate data input device through which one embodiment of the present invention is performed.

FIG. 8 is a schematic illustration showing a structure of a cross type coordinate data input device through which one embodiment of the present invention is performed. In this type of coordinate data input device, an electromagnetic signal is transmitted to a pointing device from a selected sensor coil arranged in one axial direction, for example X axis. Then another selected sensor coil arranged in the other axial direction, for example Y axis, receives a response electromagnetic signal generated by an electromagnetic interaction between the transmitted electromagnetic signal and the pointing device including a coil or a resonant circuit. The coordinate data input device shown in FIG. 8 comprises a transmitter 80 electrically connected to a first coil selector 90 for selecting the sensor coils arranged in the X axial direction and a receiver 82 electrically connected to a second coil selector 92 for selecting the sensor coils arranged in the Y axial direction. In a rough detecting process, an electromagnetic signal is transmitted through a sensor coil selected by the first coil selector 90. The second coil selector 92 is actuated in a first scanning mode to succeedingly select one from the sensor coils represented by a solid line in the receiver side skipping one so that the selected sensor coil is allowed to receive the response signal from the pointing device.

Whenever this first scanning operation can not detect the existence of the pointing device, the second scanning operation will start to succeedingly select one of the remaining sensor coils represented by broken line.

Next, the adjacent sensor coil is selected from the solid line sensor coils connected to the transmitter and the same sequence as above is repeated through the newly selected coil. In this sensor coil, the sensor coils connected to the transmitter are succeedingly selected one by one. Therefore, this case can reduce only the period of time for the receiving operation.

Figure 9:
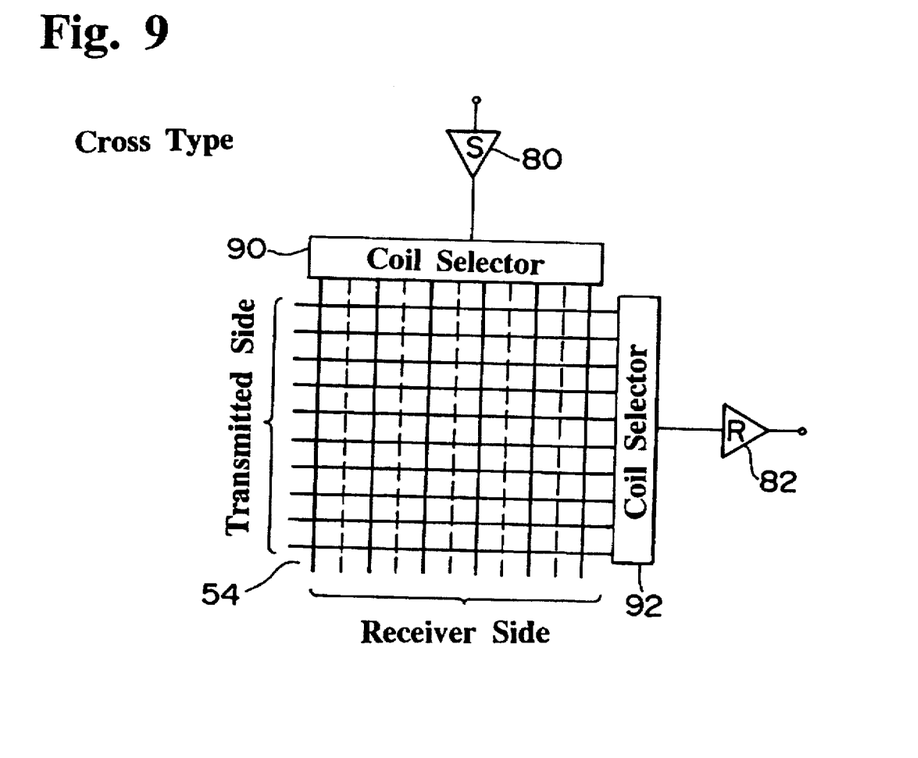
FIG. 9 is a schematic illustration showing a structure of another cross type coordinate data input device through which one embodiment of the present invention is performed.

FIG. 9 is a schematic illustration showing a structure of another cross type coordinate data input device through which one embodiment of the present invention is performed. The coordinate data input device as shown in FIG. 9 is constituted in the same manner as FIG. 8 except for the scanning system. In this device, a second coil selector is actuated to select one from the sensor coils connected to the receiver. An electromagnetic signal is succeedingly transmitted to a pointing device through one sensor coil selected by a coil selector 90 skipping one from the sensor coils represented by a solid line connected to a transmitter 80. A response signal from the pointing device is received by the selected sensor coil connected to the receiver. This operation is called the first scanning operation. Whenever this first scanning operation can not detect the existence of the pointing device, the second scanning operation will start to succeedingly select one of the remaining sensor coils (broken line) skipping one. Next, the adjacent sensor coil is selected from the sensor coils connected to the receiver and the same sequence as above is repeated through the newly selected coil. In this embodiment, the sensor coils connected to the receiver are succeedingly selected one by one. Therefore, this case can reduce only the period of time for the transmitting operation.

It is easily anticipated by one skilled in the art to combine the cross type structures shown in FIG. 8 and FIG. 9 to perform the above described interval scanning operation on both sensor coils connected to the transmitter and the receiver.

Figure 10:
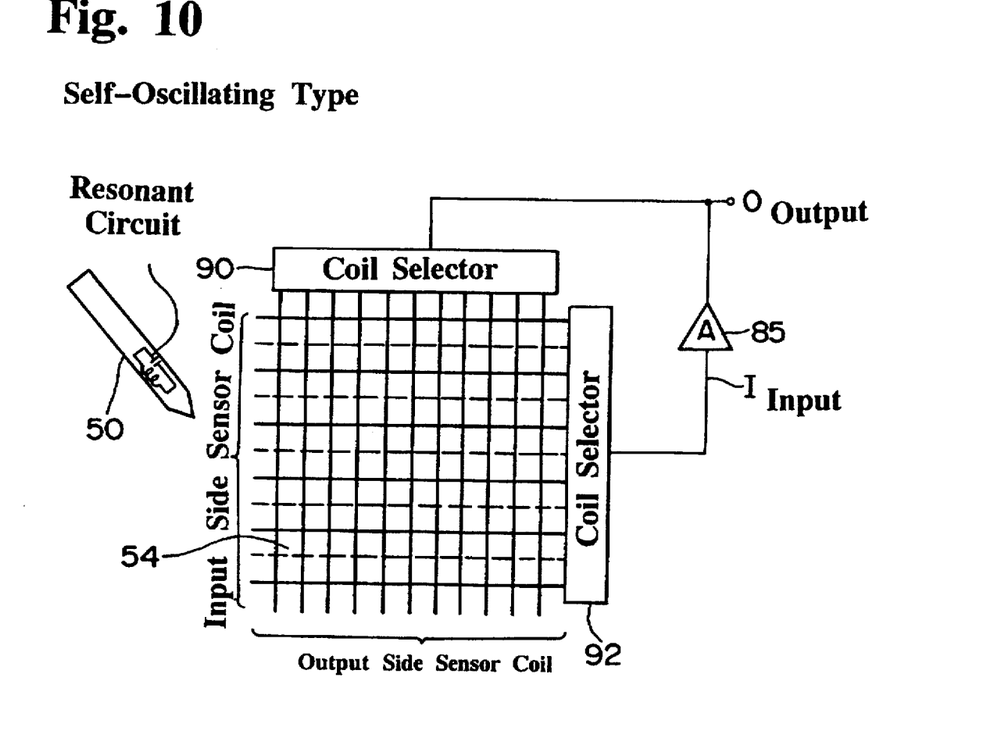
FIG. 10 is a schematic illustration showing a structure of an auto-oscillating type coordinate data input device through which one embodiment of the present invention is performed.

FIG. 10 is a schematic illustration showing a structure of self-oscillating type coordinate data input device through which one embodiment of the present invention is performed. In this type of device, sensor coils arranged in parallel in the X axial direction are free from electromagnetic engagement with that in the Y axial direction. However, when a pointing device 50 is located at cross point defined by two sensor coils belonging to different arrays, the resonant circuit in the pointing device 50 is electromagnetically coupled with two sensor coils so that positive feedback loop for an amplifier 85 connected to these sensor coils is formed. As a result, the amplifier 85 oscillates. This oscillating signal is output through an output terminal "O" and is thus used as a detected signal. In this type of device, the sensor coils arranged in parallel in the Y axial direction connected to the input terminal "I" of the amplifier 85 through a coil selector 92 are referred to as "input side sensor coils" and the sensor coils arranged in parallel in the X axial direction connected to the output terminal "O" of the amplifier 85 through a coil selector 90 are referred to as "output side sensor coils", respectively. In the detecting process of this device, one of the output side sensor coils is selected by the coil selector 90 and connected to the output terminal O of the amplifier 85. The input side sensor coils, represented by solid line, are succeedingly selected by the coil selector 92 and then the selected sensor coils are succeedingly connected to the input terminal I of the amplifier 85. This operation is referred to as the first scanning operation. Whenever this first scanning operation can not detect the existence of the pointing device, the second scanning operation will start to succeedingly select one of the remaining input side sensor coils (broken line) skipping one. In this embodiment, the output side sensor coils are succeedingly selected one by one. Therefore, this case can reduce only the period of time for scanning the input side sensor coils.

Figure 11:
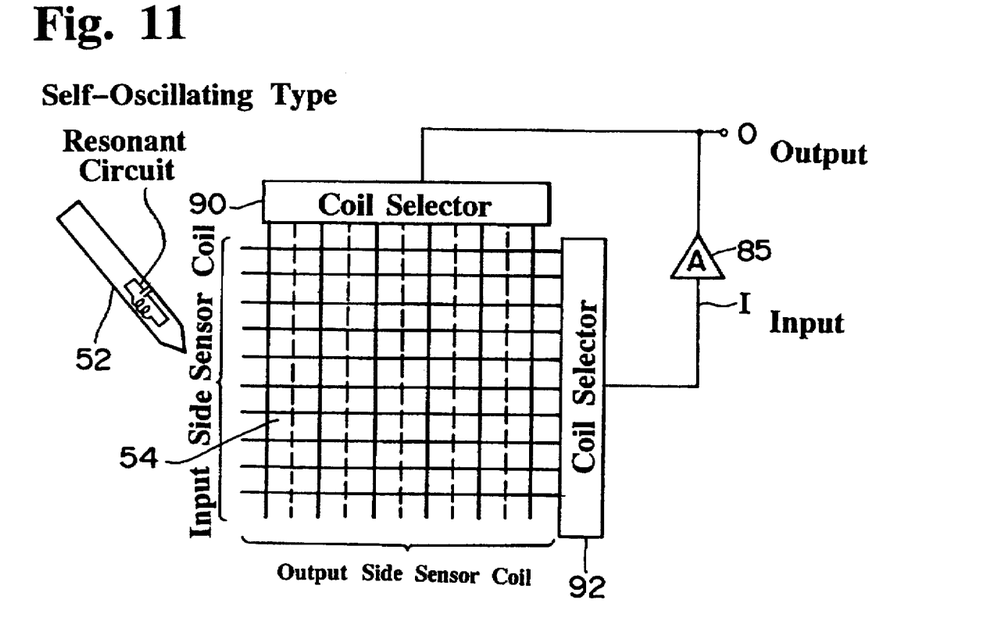
FIG. 11 is a schematic illustration showing a structure of another auto-oscillating type coordinate data input device through which one embodiment of the present invention is performed.

FIG. 11 is a schematic illustration showing a structure of another self-oscillating type coordinate data input device through which one embodiment of the present invention is performed. The coordinate data input device as shown in FIG. 11 is constituted in the same manner as FIG. 10 except for the scanning system. In this device, one of the input side sensor coils is selected by a coil selector 90 and connected to the input terminal I of an amplifier 85. The output side sensor coils, represented by solid line, are succeedingly selected by the coil selector 90 and then the selected sensor coils are succeedingly connected to the output terminal O of the amplifier 85. This operation is referred to as the first scanning operation. Whenever this first scanning operation can not detect the existence of the pointing device, the second scanning operation will start to succeedingly select one of the remaining output side sensor coils (broken line) skipping one. In this embodiment, the input side sensor coils are succeedingly selected one by one. Therefore, this case can reduce only the period of time for scanning the output side sensor coils.

It is easily anticipated by one skilled in the art to combine the auto-oscillating type structures shown in FIG. 10 and FIG. 11 to perform the above described interval scanning operation on both side sensor coils connected to the output and input terminals of the amplifier.

Furthermore, the interval scanning method according to the present invention can be also applied to a conventional coordinate data input device which includes many sensor coils arranged in parallel in one direction, divided into some groups, and one sensor coil is selected from each group on the same occasion and these selected sensor coils are mutually connected to transmit and/or receive signal. Such a type of coordinate data input device is shown for example in Japanese Patent Application Open to Public Inspection Publication No.6-75683/1994. The purpose of this conventional device is to reduce switching times during scanning over many sensor coils, and therefore the operation period for scanning over the whole sensor coils is shortened. However, each group of the divided groups includes relatively many sensor coils and every sensor coil in each group is succeedingly scanned one by one. If the interval scanning method according to the present invention is applied to each group to scan the sensor coils in each group skipping one, the period for detecting the existence of the pointing device will be remarkably decreased.

Although the above described embodiments employed the interval scanning skipping one sensor coil, the skipping rate can be freely set for any embodiments. In the above described embodiments, the skipping rate depends on selection mode of the coil selector, and control sequences for the transmitter and receiver, and signal control unit.

Assuming that the number of skipped sensor coils is represented by "n", it is necessary to perform the maximum number (n+1) of scanning operations to scan all of the sensor coils. In other words, the greatest number of the interval scanning operation repeated until the pointing device is detected is the maximum number, represented by (n+1). That is, the interval scanning operation repeated (n+1) times means all the sensor coils have been scanned. However, in case the guaranteed detectable height is ensured at a suitable level in a rough detecting process without scanning over all the sensor coils, it is not always required to repeat the scanning operation (n+1) times. In this case, any amount of times less than (n+1) can be set as the maximum scanning number. This can be applied to all of the embodiments described above.

Since the sensor coil scanning method according to the present invention performs interval scanning skipping one or more sensor coils, the location of the pointing device can be roughtly detected in a relatively short period. Accordingly, the scanning method according to the present invention can certainly detect the location of the pointing device even when the pointing device is moved quickly or at a high speed.

Since the scanning method according to the present invention provides interval scanning over all the sensor coils arranged at regular interval, the equivalent guaranteed detectable height is ensured over the whole surface of the sensor plate. This means that the location of the pointing device can be roughly detected by scanning only the minimum number of sensor coils.

Furthermore, the scanning method according to the present invention is advantegeously applied to a large scaled digitizer which requires high speed scanning over the sensor coils.

As many apparently widely different embodiments of this invention may be made without departing from the spirit and scope thereof, it is to be understood that the invention is not limited to the specific embodiments thereof except as defined in the appended claims.

What is claimed is:

1. In a coordinate data input system which includes a sensor plate containing a plurality of sensor coils arranged parallel to the detecting direction and a pointing device, and detects the coordinate data on the pointing device by an interaction between each one of the sensor coils and the pointing device, a scanning method for succeedingly selecting one from the sensor coils to detect the signal generated by the interaction comprising;

an interval scanning operation for scanning, skipping the predetermined number of sensor coils, the limited sensor coils located at the predetermined interval space of the whole sensor coils.

2. The scanning method as set forth in claim 1, wherein the interval scanning operation is repeated until the signal representing the existence of the pointing device is detected, and the interval scanning step is performed on respective arrays of the sensor coils.

3. The scanning method as set forth in claim 1, wherein the predetermined number of sensor coils to be skipped is one to three.

4. The scanning method as set forth in claim 2, wherein the interval scanning operation is applied to a first type of coordinate data input device which allows the selected sensor coil to transmit an electromagnetic signal to the pointing device and to receive the response electromagnetic signal generated by an electromagnetic interaction between the transmitted electromagnetic signal and a coil or resonant circuit included in the pointing device so that the received signal is detected as the coordinate data of the pointing device relating to the sensor plate; and the interval scanning operation is performed to select the sensor coil.

5. The scanning method as set forth in claim 2, wherein the interval scanning operation is applied to a second type coordinate data input device which allows a first group of sensor coils to transmit an electromagnetic signal to the pointing device and a second group of sensor coils to receive the response electromagnetic signal generated by electromagnetic interaction between the transmitted electromagnetic signal and a coil or resonant circuit included in the pointing device so that the received signal is detected as the coordinate data of the pointing device relating to the sensor plate; and the above described interval scanning operation is performed on both the first and second groups of sensor coils.

6. The scanning method as set forth in claim 5, wherein the first group of sensor coils and the second group of sensor coils are perpendicularly located to each other.

7. The scanning method as set forth in claim 5, wherein the above described first group of sensor coils and the second group of sensor coils are arranged in parallel.

8. The scanning method as set forth in claim 2, wherein the interval scanning operation is applied to a third type of coordinate data input device which allows the selected first group of sensor coils to transmit an electromagnetic signal to the pointing device and the selected second group of sensor coils to receive the response electromagnetic signal generated by an electromagnetic interaction between the transmitted electromagnetic signal and a coil or resonant circuit included in the pointing device so that the received signal is detected as the coordinate data of the pointing device relating to the sensor plate; and the interval scanning operation is performed on only the first group of sensor coils.

9. The scanning method as set forth in claim 8, wherein the first group of sensor coils and the second group of sensor coils are perpendicularly located to each other.

10. The scanning method as set forth in claim 8, wherein the first group of sensor coils and the second group of sensor coils are arranged in parallel.

11. The scanning method as set forth in claim 2, wherein the interval scanning operation is applied to a fourth type of coordinate data input device which allows the selected first group of sensor coils to transmit an electromagnetic signal to the pointing device and the selected second group of sensor coils to receive the response electromagnetic signal generated by electromagnetic interaction between the transmitted electromagnetic signal and a coil or resonant circuit included in the pointing device so that the received signal is detected as the coordinate data of the pointing device relating to the sensor plate; and the above interval scanning operation is performed on only the second group of sensor coils.

12. The scanning method as set forth in claim 11, wherein the first group of sensor coils and the second group of sensor coils are perpendicularly located to each other.

13. The scanning method as set forth in claim 11, wherein the first group of sensor coils and the second group of sensor coils are arranged in parallel.

14. The scanning method as set forth in claim 2, wherein the interval scanning operation is applied to a fifth type of coordinate data input device which allows the above described pointing device to transmit an electromagnetic signal and the selected sensor coil to receive the electromagnetic signal generated by an electromagnetic mutual function between the transmitted electromagnetic signal so that the received signal is detected as the coordinate data of the pointing device relating to the sensor plate; and the above interval scanning operation is performed to select the sensor coils.

15. The scanning method as set forth in claim 2, wherein the interval scanning operation is applied to a sixth type of coordinate data input device which includes an amplifier, two groups of sensor coils being perpendicularly located to each other without electromagnetic coupling, and a resonant circuit included in the pointing device so that a positive feedback loop is formed by the amplifier, the two sensor coils selected from the two groups and respectively connected to the input terminal and output terminal of the amplifier to generate an self-oscillated signal which is detected as the coordinate data of the pointing device relating to the sensor plate; and the above interval scanning operation is performed on both groups to select the sensor coils to be connected to the input terminal and output terminals of the amplifier.

16. The scanning method as set forth in claim 2, wherein the interval scanning operation is applied to a sixth type of coordinate data input device which includes an amplifier, two groups of sensor coils being perpendicularly located to each other without electromagnetic coupling, and a resonant circuit included in the pointing device so that a positive feedback loop is formed by the amplifier, the two sensor coils selected from the two groups and respectively connected to the input terminal and output terminal of the amplifier to generate an self-oscillated signal which is detected as the coordinate data of the pointing device relating to the sensor plate; and the above interval scanning operation is performed on only one group to select the sensor coil to be connected to the input terminal of the amplifier.

17. The scanning method as set forth in claim 2, wherein interval scanning operation is applied to a sixth type of coordinate data input device which includes an amplifier, two groups of sensor coils being perpendicularly located to each other without electromagnetic coupling, and a resonant circuit included in the pointing device so that a positive feedback loop is formed by the amplifier, the two sensor coils selected from the above described two groups and respectively connected to the input terminal and output terminal of the amplifier to generate an self-oscillated signal which is detected as the coordinate data of the pointing device relating to the sensor plate; and the above interval scanning operation is performed on only one group to select the sensor coil to be connected to the output terminal of the amplifier.

* * * * *